United States Patent
Kolich et al.

(10) Patent No.: US 7,850,246 B2
(45) Date of Patent: Dec. 14, 2010

(54) SHINGLED THIN SEAT CONSTRUCTION FOR VEHICLE

(75) Inventors: Michael Kolich, Windsor (CA); John W. Jaranson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 12/388,916

(22) Filed: Feb. 19, 2009

(65) Prior Publication Data

US 2010/0207430 A1  Aug. 19, 2010

(51) Int. Cl.
*A47C 7/02* (2006.01)
(52) U.S. Cl. ............... 297/452.15; 297/452.14; 297/284.4; 297/DIG. 2
(58) Field of Classification Search .......... 297/284.4, 297/452.14, 452.15, DIG. 2
See application file for complete search history.

(56) References Cited

U.S. PATENT DOCUMENTS

| | | | | |
|---|---|---|---|---|
| 3,521,929 A * | 7/1970 | Pearson | .................. | 297/452.14 |
| 4,019,777 A * | 4/1977 | Hayashi | .................... | 297/284.4 |
| 4,032,190 A * | 6/1977 | Muller-Deisig et al. | | 297/DIG. 2 |
| 4,162,807 A * | 7/1979 | Yoshimura | ................ | 297/284.4 |
| 4,316,632 A * | 2/1982 | Brauning | .................... | 297/291 |
| 4,892,356 A * | 1/1990 | Pittman et al. | ......... | 297/452.15 |
| 5,102,196 A * | 4/1992 | Kaneda et al. | .......... | 297/452.15 |
| 5,649,739 A * | 7/1997 | Zapf | ................... | 297/284.4 X |
| 5,711,575 A * | 1/1998 | Hand et al. | ............... | 297/284.6 |
| 5,879,053 A | 3/1999 | Lux et al. | | |
| 5,997,094 A | 12/1999 | Cvek | | |
| 6,378,942 B1 * | 4/2002 | Chu | ........................ | 297/284.4 |
| 6,409,268 B1 | 6/2002 | Cvek | | |
| 6,688,687 B2 * | 2/2004 | Chu | ........................ | 297/284.4 |
| 6,755,467 B1 | 6/2004 | Chu | | |
| 7,063,384 B2 * | 6/2006 | Liu | ........................ | 297/284.4 |
| 7,100,990 B2 | 9/2006 | Kimura et al. | | |
| 7,255,399 B2 | 8/2007 | White et al. | | |
| 7,303,232 B1 * | 12/2007 | Chen | ........................ | 297/284.8 |
| 7,334,841 B2 * | 2/2008 | Chou | ........................ | 297/284.4 |
| 7,625,044 B2 * | 12/2009 | Piretti | ..................... | 297/284.4 |
| 2002/0060485 A1 * | 5/2002 | Fischer et al. | ............ | 297/284.4 |
| 2005/0151400 A1 * | 7/2005 | Liu | ........................ | 297/230.13 |
| 2008/0296945 A1 * | 12/2008 | Bedford et al. | .......... | 297/284.4 |

* cited by examiner

*Primary Examiner*—Rodney B White
(74) *Attorney, Agent, or Firm*—Shock, Hardy & Bacon LLP

(57) ABSTRACT

A shingled thin seat back for a vehicle having a generally centrally-located panel which is movable in the rearward direction when the seat is occupied and which is immovable in the forward direction when folded flat to accept a load. The seat back includes a support structure which provides support to the movable panel. The support structure includes at least one edge and the panel includes at least one edge. The panel is movable from a first position where the edge of the support structure and the edge of the panel are in overlapping contact (creating a shingled arrangement) to a second position where the edge of the support structure and the edge of the panel are not in contact with one another but instead are spaced apart from one another.

20 Claims, 3 Drawing Sheets

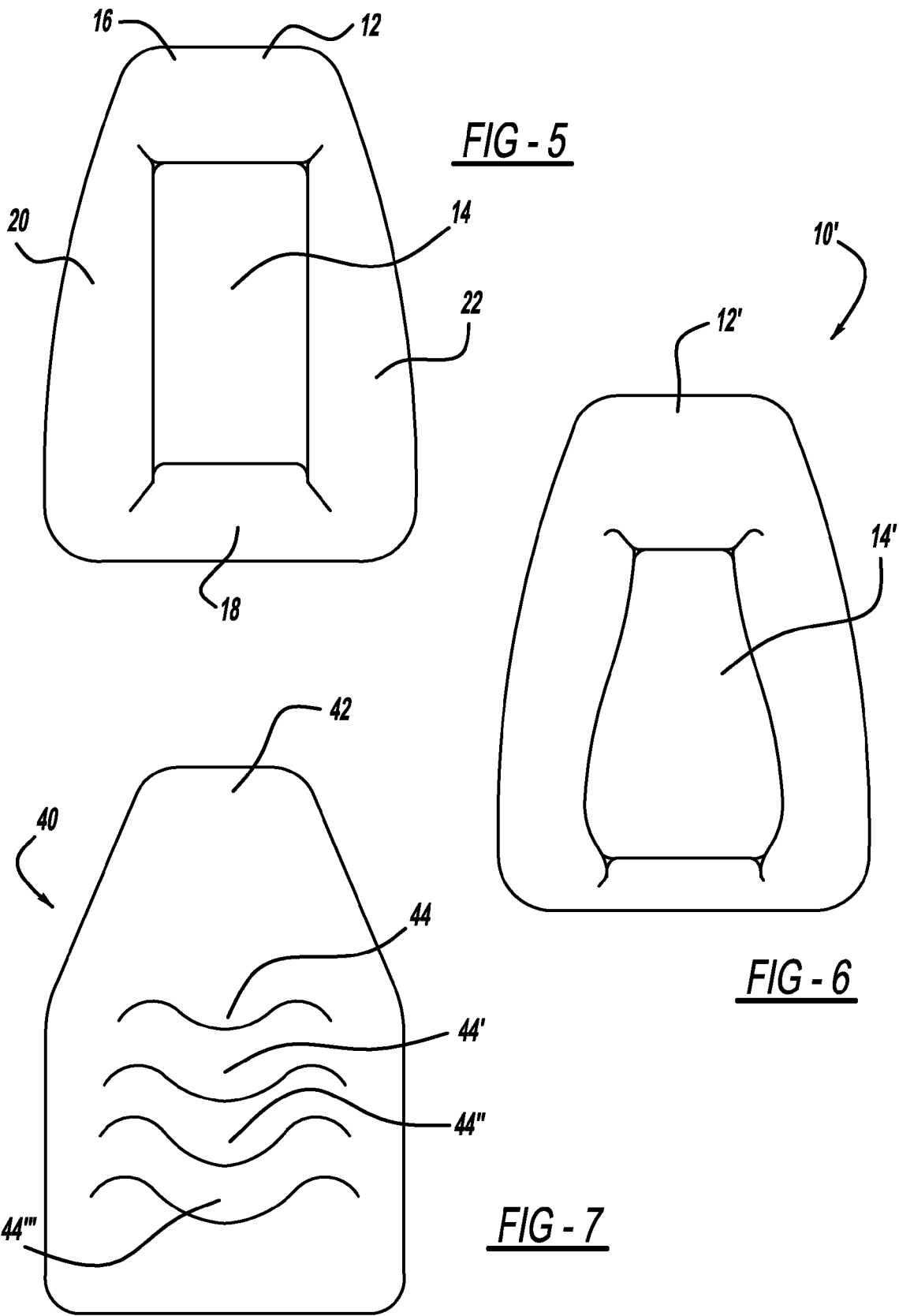

SHINGLED THIN SEAT CONSTRUCTION FOR VEHICLE

TECHNICAL FIELD

The invention disclosed herein relates generally to seat construction for a vehicle. More particularly, the disclosed invention relates to seat construction having a shingled hard back panel in the seat back capable of rearward movement when the seat is occupied. The disclosed construction also allows the seat back to accept a load when the seat back is folded flat against the seat base.

BACKGROUND OF THE INVENTION

In the early days of automotive vehicles the seats provided little comfort to the vehicle occupant. Early vehicle seat backs, in fact, did not use seat springs, but instead were only piled material (such as horse hair) on a wooden frame covered with leather. Later seat backs used springs, but for many years only the seat style and type of covering material changed, with coil springs being used in automotive applications.

In response to the desire by consumers for more comfortable seating, automotive manufacturers provided additional padding to vehicle seats (particularly seat backs), thus seats became increasingly thick. While perhaps providing some response to the needs of consumers the heavily padded vehicle seats tended to be heavy and thus compromised efforts at overall vehicle weight reduction to improve fuel economy.

Current approaches to vehicle seat construction move away from the heavily padded seat backs to thinner seat backs. When thin seat backs are fashioned the resulting article is too firm. Accordingly a challenge facing designers and manufacturers is to provide a thin seat back that is comfortable for the occupant when the seat is in ordinary use. However, this same seat must be strong enough for the seat back to support a load when the seat back is folded flat against the seat base, thus creating another challenge to designers.

Accordingly, a need exists today for an improved system for providing a vehicle seat back which overcomes the known deficiencies of current thin seat back technology.

SUMMARY OF THE INVENTION

A preferred embodiment of the disclosed invention is a seat for use in a motor vehicle having a relatively thin seat back with a central panel which is capable of rearward movement when occupied by a passenger while providing a usable load floor when the seat back is folded flat against the seat base. Accordingly, the present design solution allows for seatback and cushion deflection when occupied and required compliance when loaded.

The seat back includes a support structure and a panel movably attached to the support structure. The support structure includes at least one edge and the panel includes at least one edge. The panel is movable from a first position where the edge of the support structure and the edge of the panel are in overlapping contact (creating a shingled arrangement) to a second position where the edge of the support structure and the edge of the panel are not in contact with one another but instead are spaced apart from one another.

The support structure and panel edge combinations may be provided vertically or horizontally.

When provided vertically there are two pairs of support structure and panel edges provided in spaced apart opposition such that a rearwardly-movable panel is defined therebetween. The panel may be attached to the support structure at both its upper and lower ends or may be attached solely at one end or the other, ordinarily the lower end.

When provided horizontally a single support structure edge and a single panel edge are provided such that the edges would extend between the sides of the support structure in a substantially horizontal manner. Where the edges are thus arranged two or more pairs of support structure and panel edges may be provided in a roughly parallel arrangement. The edges may be straight or curvilinear.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein:

FIG. 5 illustrates a rear view of the seat back and highlighting the arrangement of the movable panel with respect to the adjacent support structure according to an embodiment of the disclosed invention;

FIG. 6 illustrates a view similar to that of FIG. 5 but showing a variation in the shape of the support structure and movable panel edges; and FIG. 7 illustrates an additional embodiment of the disclosed invention in which a variation on the configuration of the support structure and panel edges is shown.

DETAILED DESCRIPTION OF THE PREFERRED EMBODIMENT

Figure 1:
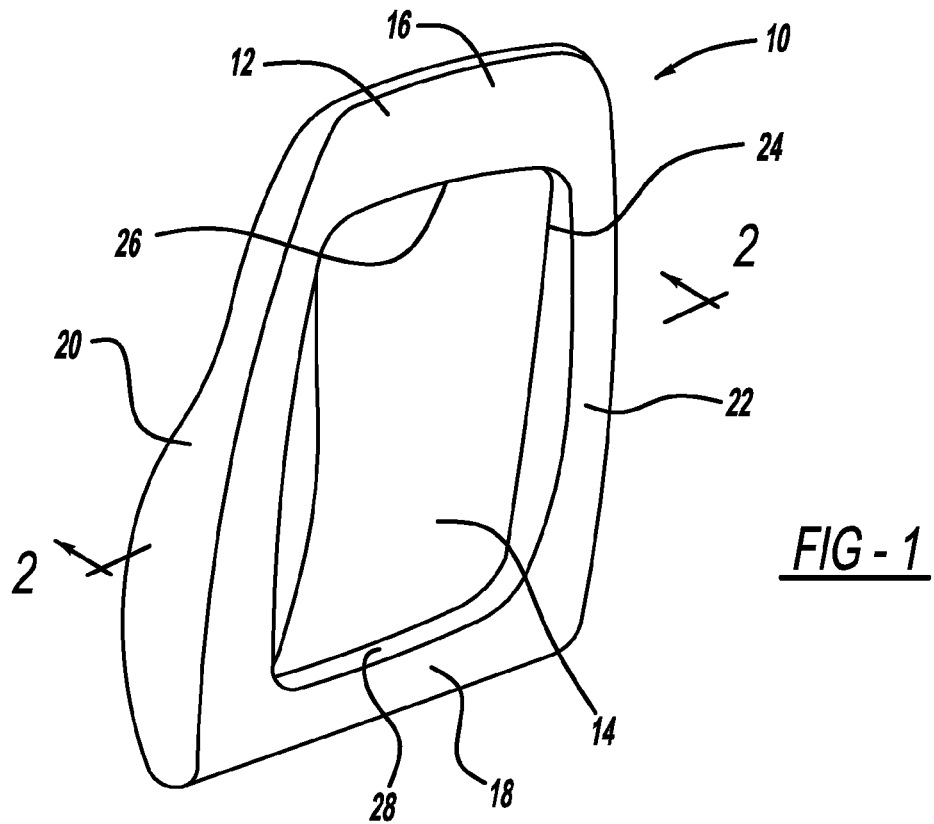
FIG. 1 illustrates a perspective view of a shingled thin seat construction of a vehicle according to an embodiment of the disclosed invention.

In the following figures, the same reference numerals will be used to refer to the same components. In the following description, various operating parameters and components are described for one constructed embodiment. These specific parameters and components are included as examples and are not meant to be limiting.

Referring to the drawings and in particular to FIG. 1, a seat back from a vehicle, generally illustrated as 10, is shown. The seat back 10 is attachable to any of a variety of seat bases (not shown) and may be employed in any environment where a relatively thin seat back is needed which is to be folded flat or substantially flat onto the seat base to accommodate a load.

The seat back 10 includes a support structure 12 and a movable panel or flex area 14. The support structure 12 may be of any of a variety of configurations and the structure illustrated is intended only as being suggestive and non-limiting.

The seat back 12 includes an upper end 16, a lower end 18, a first side 20, and a second side 22. A headrest (not shown)

may be attached to the upper end 16. The lower end 18 is attached to the seat base (not shown).

The movable panel 14 may also be of a variety of configurations, the only restriction being that the panel 14 is of such a size and shape that it fits generally within a recess 24 defined within the support structure 12, as illustrated in FIG. 1. The movable panel 14 may be made of any of a variety of materials, including any one of several polymerized materials having flexible characteristics.

The recess 24 includes an upper end 26 and a lower end 28. The movable panel 14 is preferably attached to both the upper end 26 and the lower end 28 of the recess 24, although it may be preferred that the movable panel 14 be attached to only one or the other of the upper end 26 and the lower end 28.

Figure 2:
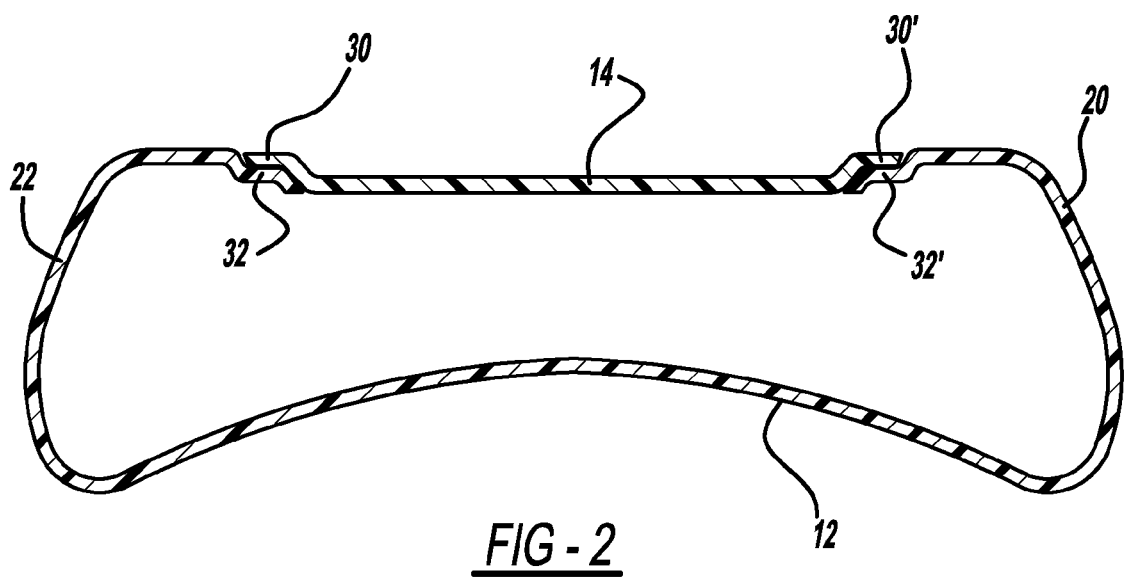
FIG. 2 illustrates a sectional view of taken along lines 2-2 of FIG. 1.
Figure 3:
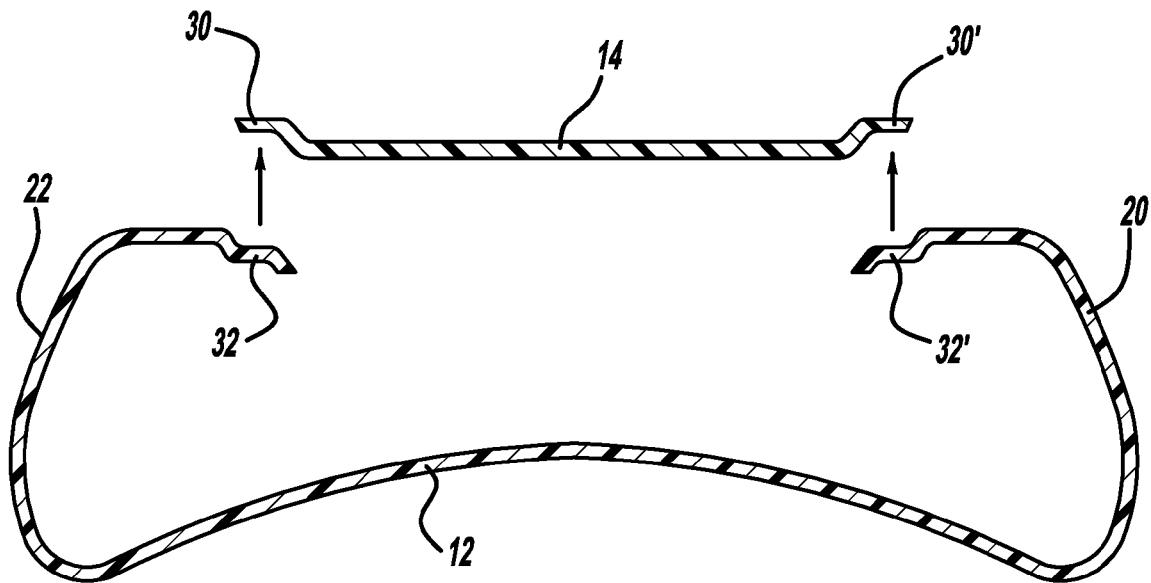
FIG. 3 illustrates sectional view similar to that of FIG. 2 but showing the movable panel moved to a position to accommodate a seated occupant.
Figure 4:
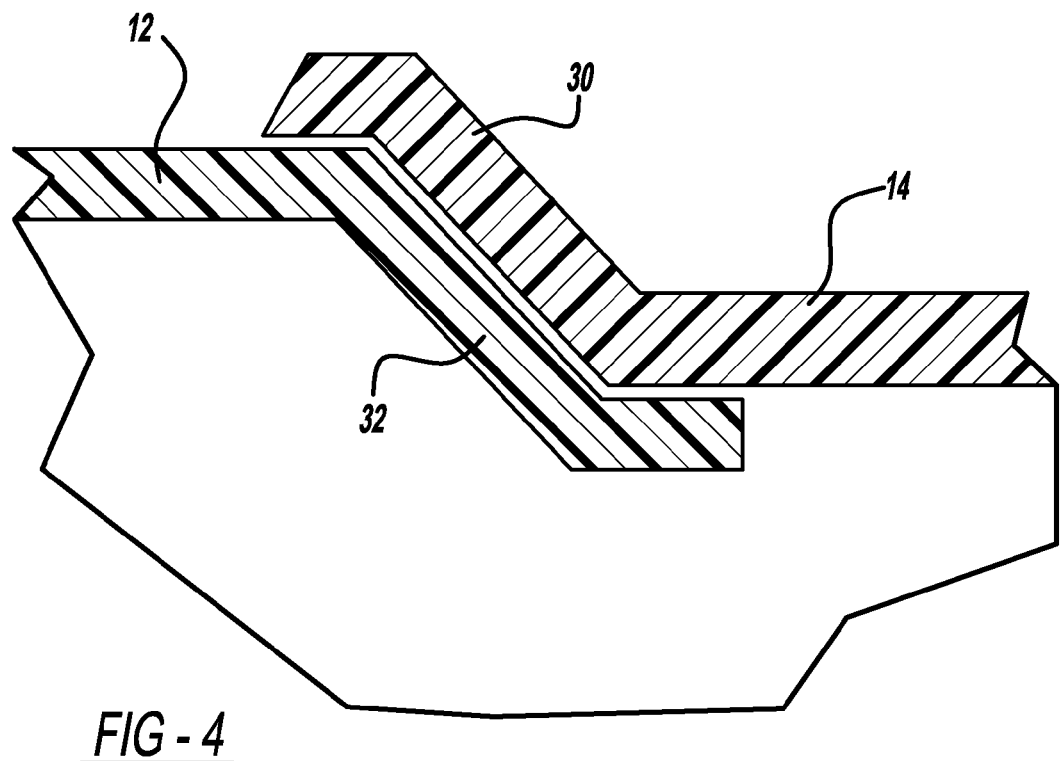
FIG. 4 illustrates the overlapping, shingled arrangement of the support structure edge and the panel edge which would arise when the seat is unoccupied or when no pressure is applied by an occupant against the movable panel.

The arrangement of the disclosed invention may be more clearly understood by reference to FIGS. 2 through 4 in which the movable panel 14 is illustrated in both its seated position which is suitable to support a load when the seat back 10 is folded flat against the seat base and in its unseated position which would arise when a seated occupant applies load against the seat back 10.

With references to FIGS. 2 through 4, the support structure 12 includes one or more supporting edges 30 and 30'. The illustrated configuration of the edges 30 and 30' is suggestive and is not intended as being limiting. The movable panel 14 also includes one or more supporting edges 32 and 32'. The illustrated configuration of the edges 32 and 32' is suggestive and is not intended as being limiting. The only limiting features of the arrangement of the support structure edges and the movable panel edges are, first, that the number of support structure edges is the same as the number of panel edges, regardless of the version of the support structure and panel arrangement and, second, that the edge(s) of the movable panel overlap or is shingled in some way the edge(s) of the support structure such that rearward movement of the movable panel 14 relative to the support structure 12 is allowed while forward movement of the movable panel 14 relative to the support structure 12 is disallowed.

In FIG. 2 the movable panel 14 is illustrated in its seated position relative to the support structure 12. In this way the panel edge 30 is substantially in contact with the support structure edge 32 and the panel edge 30' is substantially in contact with the support edge 32'. The illustrated seated position of the movable panel 14 relative to the support structure 12 as shown in FIG. 2 (and in detail in FIG. 4) is achieved when no load is applied to the movable panel 14 from the front of the seat back 10. In this position the seat back 10 can accept a load (not shown) when the seat back 10 is folded against the seat base.

When a load is applied from the front of the seat back 10 by a seated occupant the movable panel 14 is allowed to move vehicle rearward as illustrated in FIG. 3. As shown the movable panel edge 30 is no longer resting against the support structure edge 32 and the movable panel edge 30' is no longer resting against the support structure edge 32'. Rearward movement of the movable panel 14 is restricted at some point by the connection of the movable panel 14 to the support structure 12 as described above with respect to FIG. 1.

As mentioned above, the configuration of the movable panel 14 and the corresponding configuration of the recess 24 may be any of a variety of possible configurations. Referring to FIG. 5, a rear view of the seat back 10 illustrating the embodiment of FIG. 1 is shown. This figure more clearly illustrates the generally parallel pair of support structure and panel edges.

However, it may be preferred that the alignment of the edges be tuned for specific applications. An illustration of such a tuned/tunable embodiment is set forth in FIG. 6, in which a seat back, generally illustrated as 10', is shown having a supporting structure 12' and a movable panel 14'. As illustrated, the support structure edges and the corresponding panel edges are curvilinear. The illustrated configuration is only suggestive as other edge configurations may be adopted for specific applications.

As a further variation of the shingled thin seat construction for a seat back according to the disclosed invention, FIG. 7 shows a seat back 40 having a support structure 42 which has a series of movable panels 44, 44', 44", and 44''' provided thereon. The curvilinear edges of the movable panels 44, 44', 44", and 44''' overlap the corresponding curvilinear edges of the support structure 42. It is to be understood that the number and placement of the panels as well as the shape of the edges as set forth is shown for illustrative purposes only as any of a wide variety of configurations may be adapted for use in the disclosed invention.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A seat for use in a vehicle, the seat comprising:
    a seat base;
    a seat back including a support structure operatively associated with said seat base and a panel operatively associated with said support structure, said panel being movable with respect to said support structure, said support structure including an edge and said panel including an edge, said support structure edge is angled relative to said support structure and said panel edge is angled relative to said panel, said panel being movable from a first position where said edge of said support structure and said edge of said panel are substantially in overlapping contact with one another to a second position where said edge of said support structure and said edge of said panel are at least partially spaced apart from one another.

2. The seat of claim 1 wherein said support structure edge is a first support structure edge and wherein said panel edge is a first panel edge, said seat back further including a second support structure edge and a second panel edge, said second support structure edge being in substantially overlapping contact with said second panel edge when said panel is in said first position and being at least partially spaced apart from one another when said panel is in said second position.

3. The seat of claim 2 wherein said first support structure edge and said second support structure edge are substantially parallel with one another.

4. The seat of claim 3 wherein said first panel edge and said second panel edge are substantially parallel with one another.

5. The seat of claim 4 wherein said support structure includes an upper portion and a lower portion and wherein edges extend substantially between said upper portion and said lower portion.

6. The seat of claim 5 wherein said panel is attached to said support structure at said lower portion.

7. The seat of claim 6 wherein said panel is additionally attached to said support structure at said upper portion.

8. The seat of claim 1 wherein said support structure includes a first side and a second side and said edge of said support structure and said edge of said panel general extend between said first side of said support structure and said second side of said support structure.

9. The seat of claim 1 wherein said angle of said support structure edge and said angle of said panel edge are substantially the same.

10. A seat back for a vehicle seat comprising:
   a support structure;
   a panel operatively associated with said support structure, said panel being movable with respect to said support structure between a first position and a second position, said support structure including an edge and said panel including an edge, said support structure edge is angled relative to said support structure and said panel edge is angled relative to said panel, said edge of said support structure and said edge of said panel substantially overlapping one another when said panel is in said first position with respect to said support structure.

11. The seat back for a vehicle seat of claim 10, wherein said support structure edge is a first support structure edge and wherein said panel edge is a first panel edge, said support structure further including a second support structure edge and a second panel edge, said second support structure edge being in substantially overlapping contact with said second panel edge when said panel is in said first position and being at least partially spaced apart from one another when said panel is in said second position.

12. The seat back for a vehicle seat of claim 11 wherein said first support structure edge and said second support structure edge are substantially parallel with one another and wherein said first panel edge and said second panel edge are substantially parallel with one another.

13. The seat back for a vehicle seat of claim 12 wherein said support structure includes an upper portion and a lower portion and wherein edges extend substantially between said upper portion and said lower portion.

14. The seat back for a vehicle seat of claim 13 wherein said panel is attached to said support structure at said lower portion.

15. The seat back for a vehicle seat of claim 14 wherein said panel is additionally attached to said support structure at said upper portion.

16. The seat back for a vehicle seat of claim 10 wherein said support structure includes a first side and a second side and said edge of said support structure and said edge of said panel general extend between said first side of said support structure and said second side of said support structure.

17. The seat back for a vehicle seat of claim 16 wherein said edge of said support structure and said edge of said panel are curvilinear.

18. The seat of claim 10 wherein said angle of said support structure edge and said angle of said panel edge are substantially the same.

19. A seat back for a vehicle seat comprising:
   a support structure having a central portion, said central portion having a lip;
   a movable panel generally provided in association with said central portion of said support structure, said movable panel having a lip, said lip of said central portion and said lip of said movable panel overlapping, said lip of said central portion being angled relative to said support structure and said lip of said movable panel being angled relative to said movable panel.

20. The seat back for a vehicle seat of claim 19 wherein said angle of said lip of said support structure edge and said angle of said lip of said movable panel are substantially the same.

\* \* \* \* \*